(12) United States Patent
Moon

(10) Patent No.: US 6,496,242 B1
(45) Date of Patent: Dec. 17, 2002

(54) INTERMEDIATE LIQUID CRYSTAL DISPLAY DEVICE PRODUCT HAVING AN END POINT DETECTION WINDOW, METHOD OF FABRICATION AND METHOD OF DETECTING ETCHING END POINT

(75) Inventor: Kyo Ho Moon, Daeku (KR)

(73) Assignee: LG. Philips LCD Co., Ltd., Seoul (KR)

( * ) Notice: Subject to any disclaimer, the term of this patent is extended or adjusted under 35 U.S.C. 154(b) by 76 days.

(21) Appl. No.: 09/640,859

(22) Filed: Aug. 18, 2000

(30) Foreign Application Priority Data

Aug. 19, 1999 (KR) .............................. 99-34360

(51) Int. Cl.[7] .......................... G02F 1/1343; G02F 1/13; C30B 33/00; C23F 1/00
(52) U.S. Cl. ...................... 349/143; 349/187; 349/192; 216/23; 216/72
(58) Field of Search ................................ 349/143, 187, 349/192, 139; 216/23, 39, 61, 72, 58, 59; 438/30, 158, 689

(56) References Cited

U.S. PATENT DOCUMENTS 5,747,380 A * 5/1998 Yu et al. ...................... 438/599
6,188,461 B1 * 2/2001 Moon ........................... 216/23

FOREIGN PATENT DOCUMENTS

JP 60-106976 * 6/1985
JP 7-168203 * 7/1995

* cited by examiner

Primary Examiner—William L. Sikes
Assistant Examiner—Tarifur R Chowdhury
(74) Attorney, Agent, or Firm—Birch, Stewart, Kolasch & Birch, LLP

(57) ABSTRACT

In a partially formed liquid crystal display device, a window definition layer defines an etching endpoint detection window over a dummy pattern formed on the substrate. The window definition layer also defines an etch window over a real pattern formed on the substrate. The real pattern and the dummy pattern have the same thickness. During an etching process, a reactant from the etching step is monitored to determine when to stop the etching process.

41 Claims, 8 Drawing Sheets

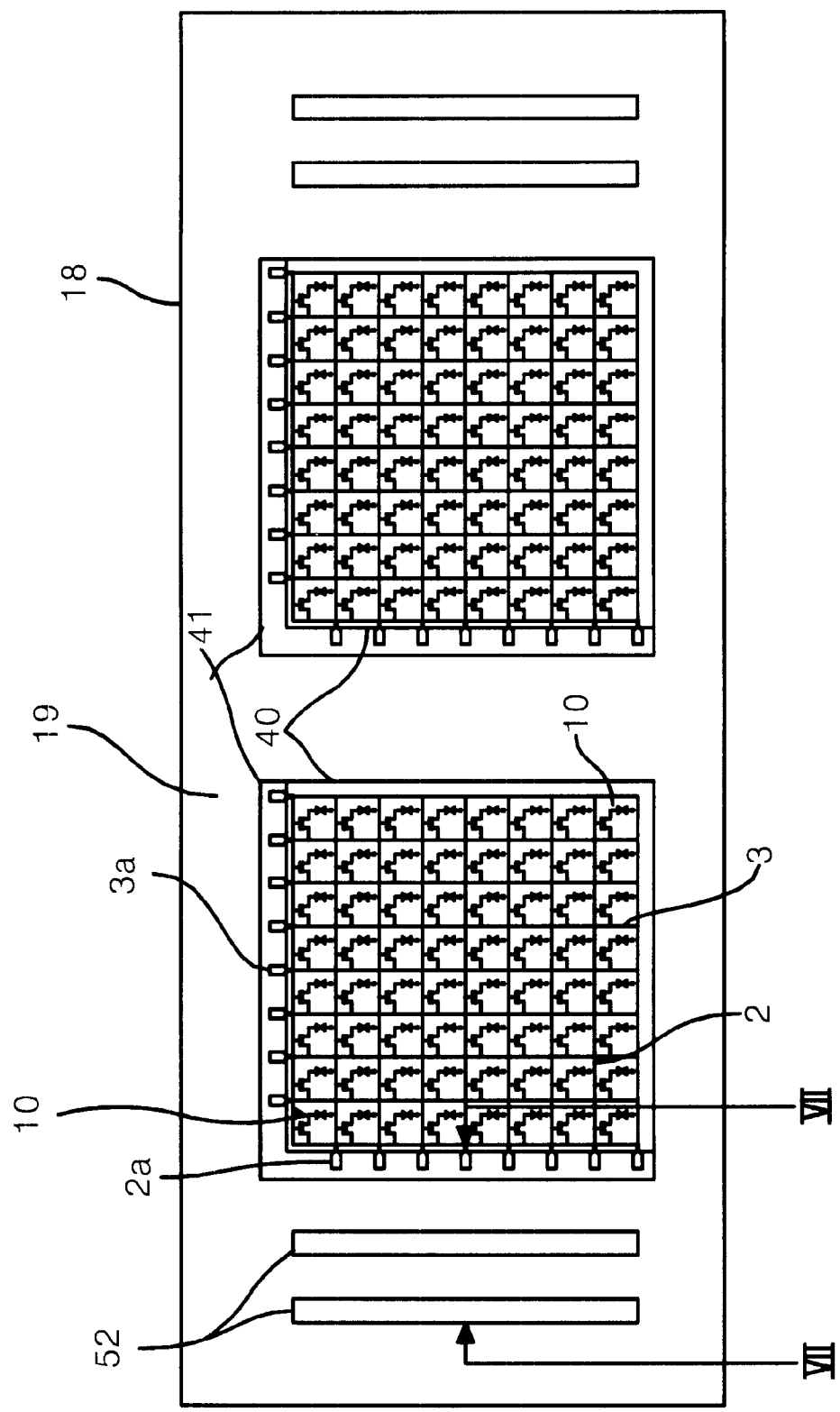

INTERMEDIATE LIQUID CRYSTAL DISPLAY DEVICE PRODUCT HAVING AN END POINT DETECTION WINDOW, METHOD OF FABRICATION AND METHOD OF DETECTING ETCHING END POINT

BACKGROUND OF THE INVENTION

1. Field of the Invention

The present invention relates to an etching end point detection window used in the fabrication of a liquid crystal display device to detect an etching end time accurately and a method of fabricating the etching end point detection window. Also, the present invention is directed to an etching end point detecting method for detecting an etching end time using the etching end point detection window.

2. Description of the Related Art

Generally, an active matrix type of liquid crystal display device displays a picture using a pixel (or picture element) matrix having pixels arranged at intersections between gate lines and data lines. Each pixel includes a liquid crystal cell controlling a transmitted light quantity in accordance with a voltage level of a data signal from the data line. Thin film transistors (TFTs) are installed at the intersections between the gate lines and the data lines to switch a data signal to be transmitted toward a liquid crystal cell in response to a scanning signal from the gate line.

Referring to FIG. 1, there is shown a TFT formed on a substrate 18. Hereinafter, a method of fabricating the TFT will be described. First, a gate electrode 20, made from Al or a metal film including Al or the like, is formed on the substrate 18. The gate electrode 20 is integral with a gate line(not shown). On the substrate 18 and the gate electrode 20, a gate insulating film 22 made of an inorganic film, such as $SiN_x$, $SiO_x$ or the like, is provided.

A semiconductor layer 24 made from an amorphous Si, hereinafter referred to as a-Si, and an Ohmic contact layer 26 made from a-Si doped with N+ ions are sequentially deposited on the gate insulating film 22. A source electrode 28 and a drain electrode 30 made from a metal such as Cr, etc. are provided on the Ohmic contact layer 26 and the gate insulating film 22. The source electrode 28 is integral with a data line (not shown). The Ohmic contact layer 26 exposed through an opening between the source electrode 28 and the drain electrode 30 are removed by means of dry or wet etching. A protective film 32 made from $SiN_x$ or $SiO_x$ is deposited over the substrate 18 to cover the TFT. The protective film 32 has the same thickness on the substrate 18 and is deposited with an inorganic material.

In order to provide contact holes, a portion of the protective film 32 disposed on a pad of the drain electrode 30, the data line and the gate line are etched out. At this time, a pixel electrode 34 made from indium tin oxide is electrically connected, via a contact hole through the protective film 32, to the drain electrode 30. Output lines of drive circuits are electrically connected, via contact holes defined by the protective film 32, to the pads of the data line and the gate line, respectively.

As seen from the foregoing, etching is performed in forming the electrode pattern and the contact holes. And, because an etched area defined only by the pattern during the etching process is small, it is difficult to sense an etched depth accurately. Accordingly, as shown in FIG. 2, an end point detection (EDP) window 42 is provided at the outside of a display region 40, that is, a non-display region 19. A number of gate lines 2 and a number of data lines 3 are formed in a direction perpendicular to each other in the display region 40. TFTs 10 are formed at intersections between the gate lines 2 and the data lines 3. The non-display region 19 includes (1) the peripheral area of the display region 40 where pads 2a and 3a, formed at the ends of the gate lines 2 and the data lines 3, respectively, are located, (2) the edge area of the substrate 18, and (3) an area between the display regions 40. After fabrication of the TFTs 10 is completed, the display region 40 and the pads 2a and 3a are cut along a line 41 in such a manner that the display region 40 includes the pads 2a and 3a.

FIG. 3A and FIG. 3B are sectional views taken along line III—III in FIG. 2 for the purpose of explaining an etching process for defining a contact hole at a pad of a gate line. As shown, a photo-resist pattern 44 is formed on the substrate 18 so as to define a contact hole 21a on the pad 2a of the gate line. Specifically, an EPD window 42 and a real pattern window 43 are formed in the photo-resist pattern 44 through exposure and development. The gate insulating film 22 and the protective film 32 are disposed between the EDP window 42 and the substrate 18. The pad 2a of the gate line, the gate insulating film 22 and the protective film 32 are disposed between the real pattern window 43 and the substrate 18. The substrate 18, patterned with the EDP window 42 and the real pattern window 43, is mounted within an etching chamber so as to form the contact hole 21a to the pad 2a of the gate line. $SF_6$ gas is then injected into the etching chamber. At this time, an etchant including $SF_6$ gas contacts the protective film 32 through the EDP window 42 and the real pattern window 43, and simultaneously begins to etch the protective film 32.

The etchant and the protective film 32 react to produce a nonvolatile gas $SiF_4$. After the protective film 32 within the real pattern window 43 is removed, the gate insulating film 22 is removed to expose the pad 2a of the gate line. Also, the protective film 32 and the gate insulating film 22 within the EDP window 42 are removed to expose the substrate 18 under the EDP window 42. The concentration of $SiF_4$ gas dramatically decreases or is no longer generated once the pad 2a of the gate line and the substrate 18 are exposed. Accordingly, an operator can determine an etching end time by sensing a concentration difference in or generation of $SiF_4$ gas. Herein, the $SiF_4$ gas evacuated during etching is converted into a voltage signal so that an operator can easily perform the sensing operation.

A liquid crystal display has the advantages of small dimensions (e.g., being slim) and low power consumption. And, studies for improving the liquid crystal display device are ongoing to further reduce power consumption. Recently, a scheme for overlapping the pixel electrode 34 with the data line 3 has become a prevailing technique. In this technique, in order to reduce a parasitic capacitance between the data line 3 and the superimposed pixel electrode 34, the protective film 32, formed between the pixel electrode 34 and the data line 3, is made from an organic substance with a low dielectric constant instead of an inorganic substance. For example, an organic material, such as Benzocyclobutene (BCB), is used as a material for the protective film 32.

Generally, the organic substance is grown into a film by spin-coating and thus the surface of the film becomes even. In this case, as shown in FIG. 4A, an organic protective film 46 exposed by the EPD window 42 is thicker than the film exposed by the real pattern window 43. Specifically, a relationship of a thickness t1 of the organic protective film 46 under the EPD window 43 to a thickness t2 of the organic protective film 46 under the real pattern window 43 is t1>t2.

Thus, after etching the organic protective film 46 to expose the pad 2*a* of the gate line, a portion of the organic protective film 46 exposed by the EPD window 42 remains. As shown in FIG. 4B, a thickness of Dt remains once the pad 2*a* of the gate line is exposed. As a result, there is only a slight variation in the amount of evacuated $SiF_4$ gas once the pad 2*a* of the gate line is exposed, and it is difficult to determine an etching end point. Accordingly, as shown in FIG. 4C, the pad 2*a* of the gate line can become damaged from overetching. Also the photoresist pattern 44 sticks onto the organic protective film 46 to cause a defect at the time of forming the pixel electrode 34.

SUMMARY OF THE INVENTION

Accordingly, it is an object of the present invention to provide an etching end point detection window in a liquid crystal display device that is capable of detecting an etching end time accurately.

A further object of the present invention is to provide an etching end point detecting method for detecting an etching end time by utilizing an etching end point detection window.

These and other objects are achieved by an intermediate liquid crystal display device product, comprising a real pattern formed on a substrate; a dummy pattern formed on the substrate, the dummy pattern having a same thickness as the real pattern; and a window definition layer defining an etching end point detection window over the dummy pattern.

These and other objects are further achieved by a method of forming an etching end point detection window, comprising forming a real pattern on a substrate; forming a dummy pattern having a same thickness as the real pattern on the substrate; and forming a window definition layer defining an etching end point detection window over the dummy pattern.

These and other objects are still further achieved by an etching end point detecting method, comprising forming a real pattern on a substrate; forming a dummy pattern having a same thickness as the real pattern on the substrate; forming a window definition layer which defines an etching end point detection window over the dummy pattern and an etch window over the real pattern; etching via the etching end point detection window and the etch window; detecting a reaction result from the etching step; and determining an etching end point based on output from the detecting step.

BRIEF DESCRIPTION OF THE DRAWINGS

These and other objects of the invention will be apparent from the following detailed description of the embodiments of the present invention with reference to the accompanying drawings, in which:

FIG. 5 is a plan view showing a substrate provided with an etching end point detection window according to an embodiment of the present invention;

DETAILED DESCRIPTION OF THE PREFERRED EMBODIMENT

Figure 1:
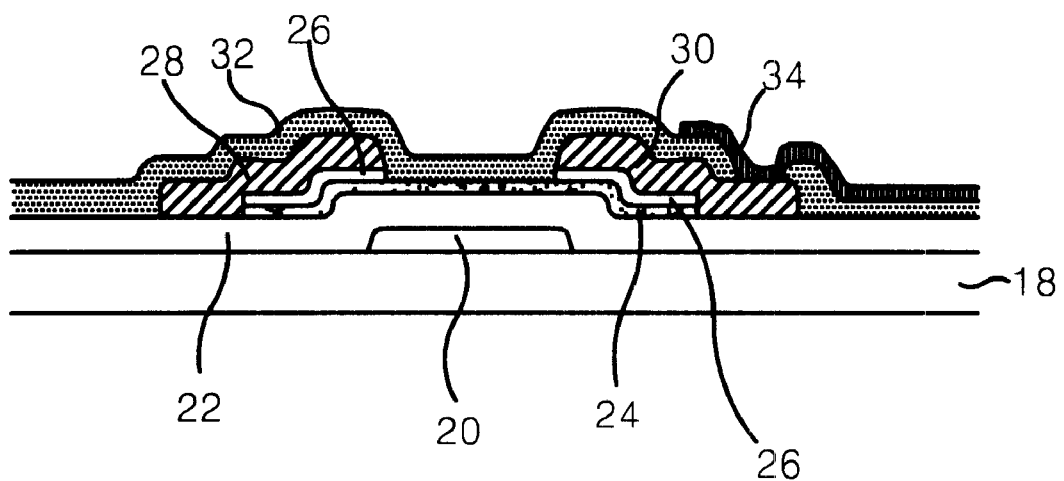
FIG. 1 is a sectional view showing the structure of a prior art thin film transistor.
Figure 2:
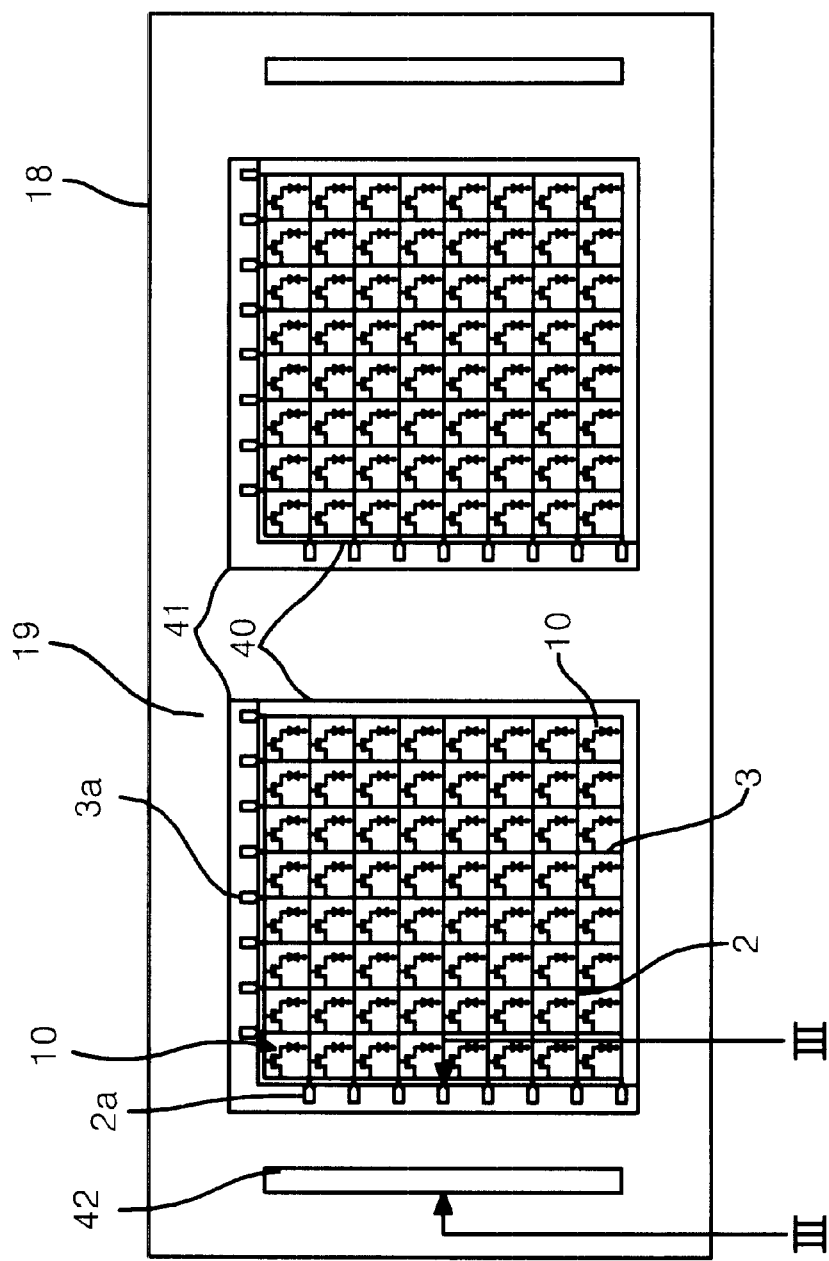
FIG. 2 is a plan view showing a substrate provided with a prior art etching end point detection window.
Figure 3A:
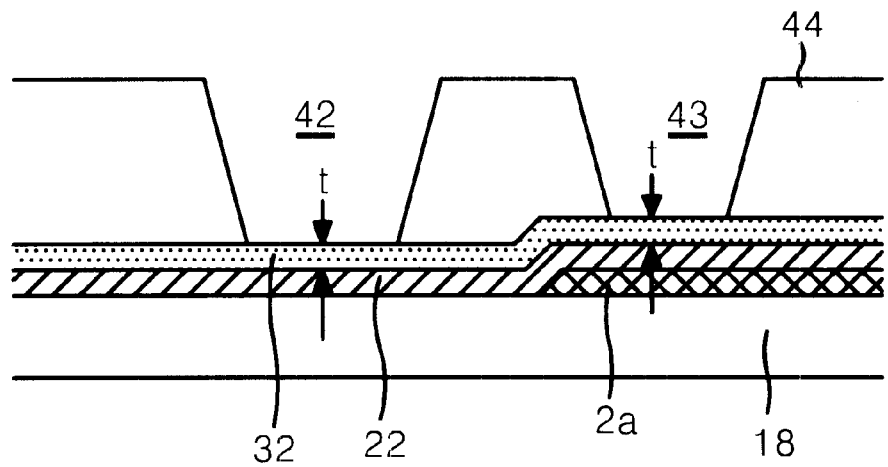
FIG. 3A and FIG. 3B are sectional views taken along line III—III in FIG. 2 for the purpose of explaining an etching process for defining a contact hole at a pad of a gate line.
Figure 3B:
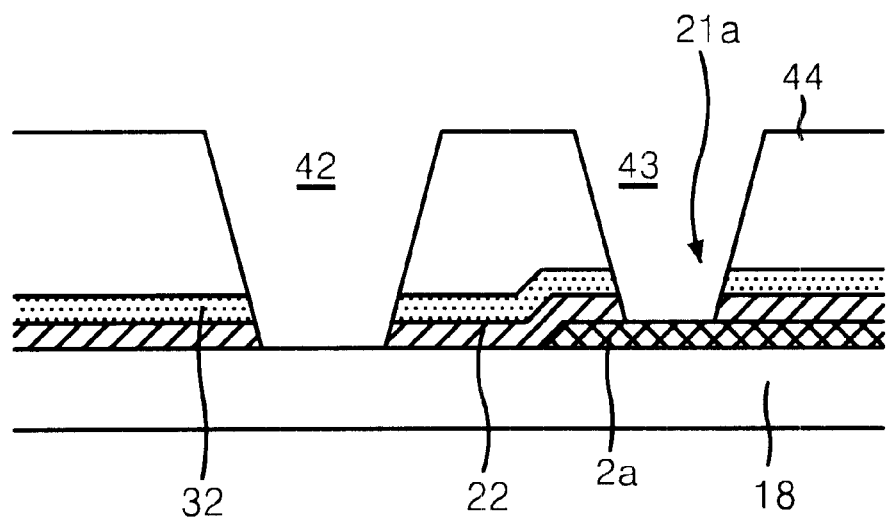
Figure 4A:
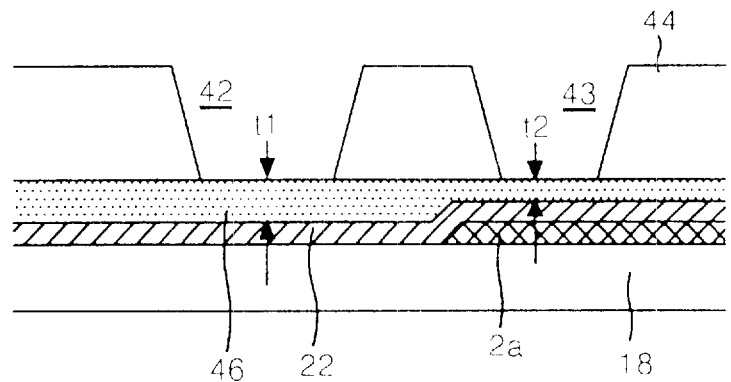
FIGS. 4A–4C are sectional views showing an etching process for defining a contact hole at an organic protective film.
Figure 4B:
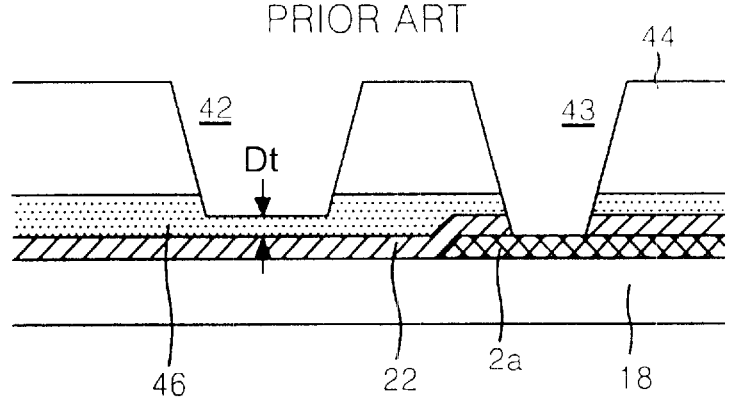
Figure 4C:
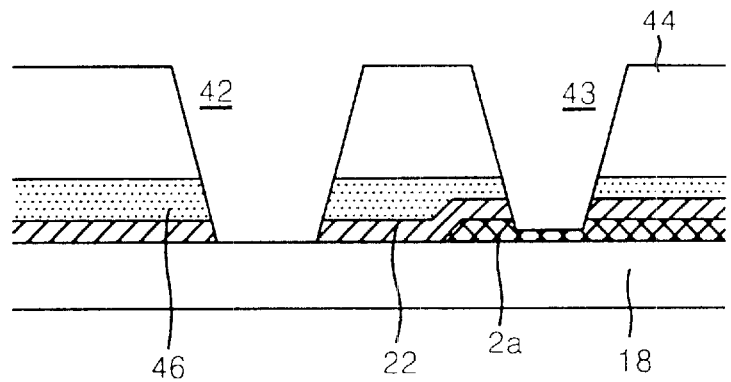
Figure 6:
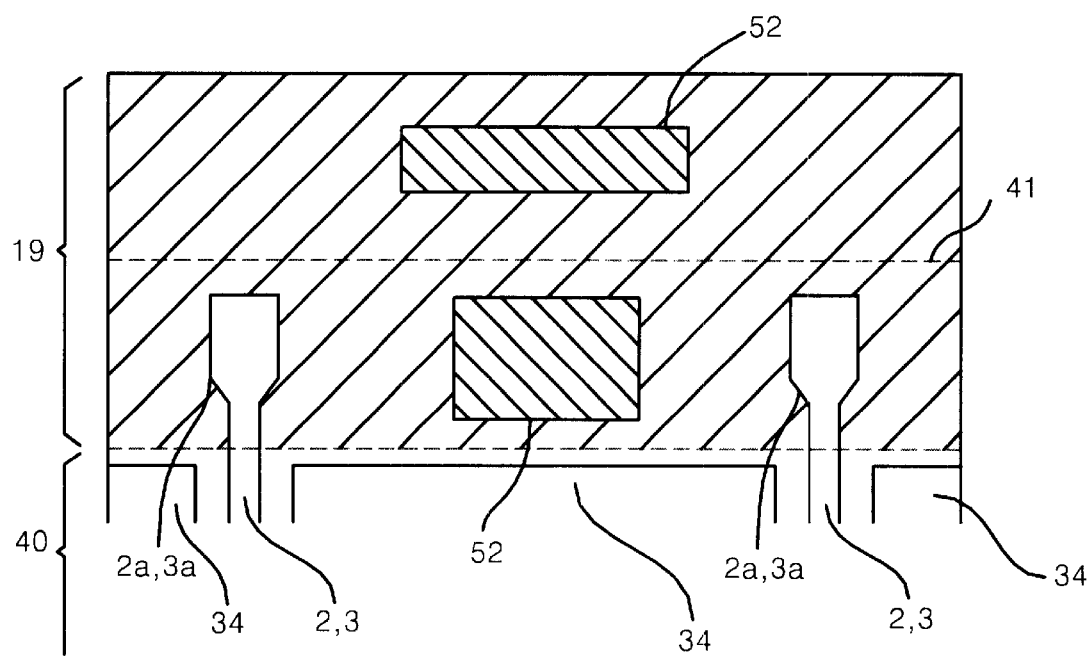
FIG. 6 is a view representing an etching end point detection window formed between the pads shown in FIG. 5.

FIG. 5 illustrates a liquid crystal display device prior to completion of the fabrication process; namely, an intermediate liquid crystal display device product. Referring to FIG. 5, such a liquid crystal display device according to the present invention is provided with a number of EPD windows 52 formed at a non-display region 19 of a substrate 18. The EPD windows 52 are formed on the edge of the substrate 18, that is, the non-display region 19 remaining after completion of substrate fabrication and after the display regions 40 including the pads 2*a* and 3*a* are cut out. Alternatively, as shown in FIG. 6, the EPD windows 52 may be formed at a space between pads 2*a* and 3*a*, that is, a non-display region 19 at the peripheral area of a display region 40.

It is desirable to set an area of an EPD window 52 to less than ⅓ of the area of the non-display region 19 when the entire substrate area is 25 $cm^2$. A dummy pattern is formed under the EPD window 52. Preferably, the dummy pattern has the same thickness as a real pattern to be etched within the display region 40, and is formed on the substrate using the same material.

Figure 7A:
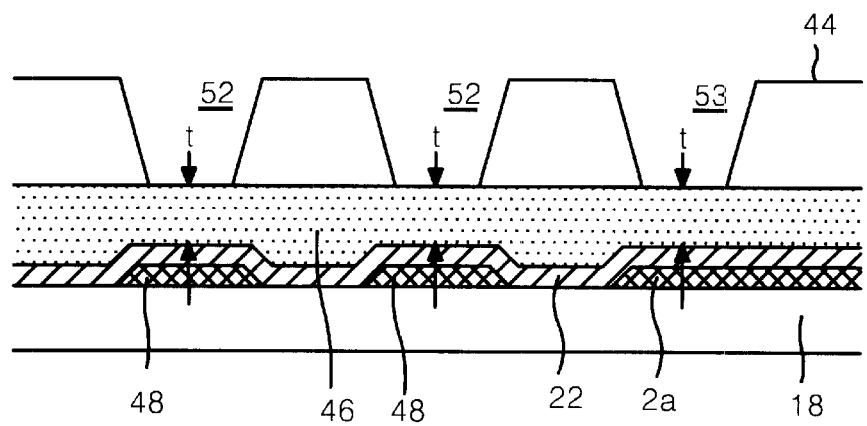
FIGS. 7A to 7C are sectional views taken along line VII—VII in FIG. 5 for the purpose of explaining an etching process for defining a contact hole at the pad of the gate line when the protective film is made from an organic substance.
Figure 7B:
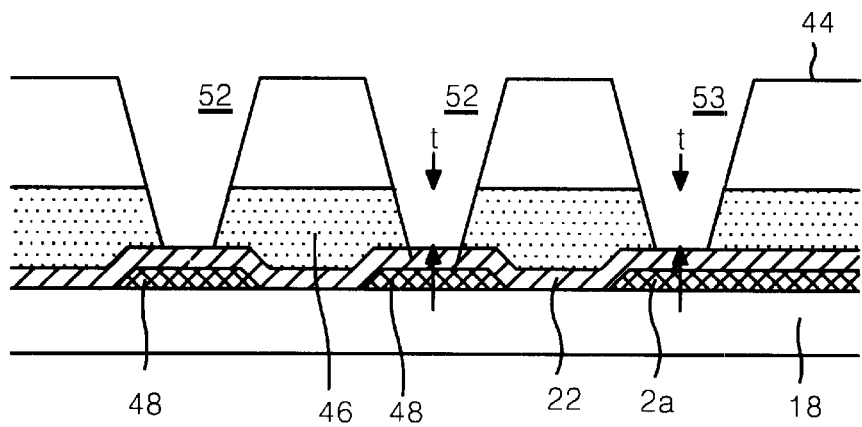
Figure 7C:
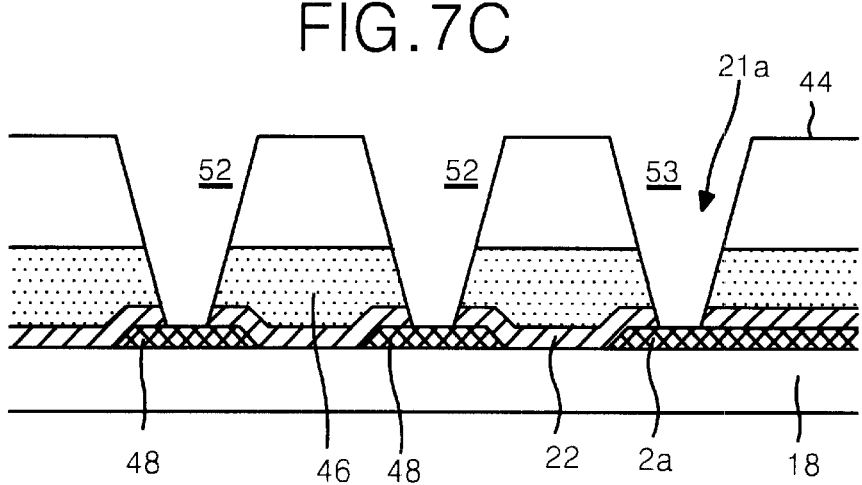

FIGS. 7A to 7C are sectional views taken along line VII—VII in FIG. 5 for the purpose of explaining an etching process for defining a contact hole at the pad of the gate line when the protective film is made from an organic substance. Referring to FIGS. 7A to 7C, photo-resist 44 defines the EPD windows 52 over the dummy patterns 48 and defines the real pattern window 53 over the pad 2*a* of a gate line. The dummy pattern 48 is made from the same material (e.g., Mo/Al) as a gate line 2 and a data line 3, and a thickness of the dummy pattern 48 is equal to that of the gate line 2 and the data line 3. Preferably, the dummy pattern 48 is formed simultaneously with gate lines 2 and gate pads 2*a*.

As seen from FIG. 7A, a gate insulating film 22, made from an inorganic substance such as SiN. is deposited over the dummy pattern 48 and the pad 2*a* of the gate line 2. On the gate insulating film 22, an organic protective film 46 is coated evenly through spin-coating. Accordingly, a thickness of the organic protective film 46 under the EPD windows 52 becomes equal to a thickness(t) of the organic protective film 46 formed on the pad 2*a* of the gate line 2.

In order to define a contact hole 21*a* where the organic protective film 46 coats the pad 2*a* of the gate line 2, the substrate 18, patterned with the EPD windows 52 and the real pattern window 53, is loaded within an etching chamber. A $SF_6$ gas is then injected into the etching chamber. At this time, an etchant including the $SF_6$ gas begins to etch the organic protective film 46 through the EPD window 52 and the real pattern window 53. At the same time, the etchant reacts with Si included in the organic protective film 46 to produce a volatile gas, $SiF_4$.

Figure 8:
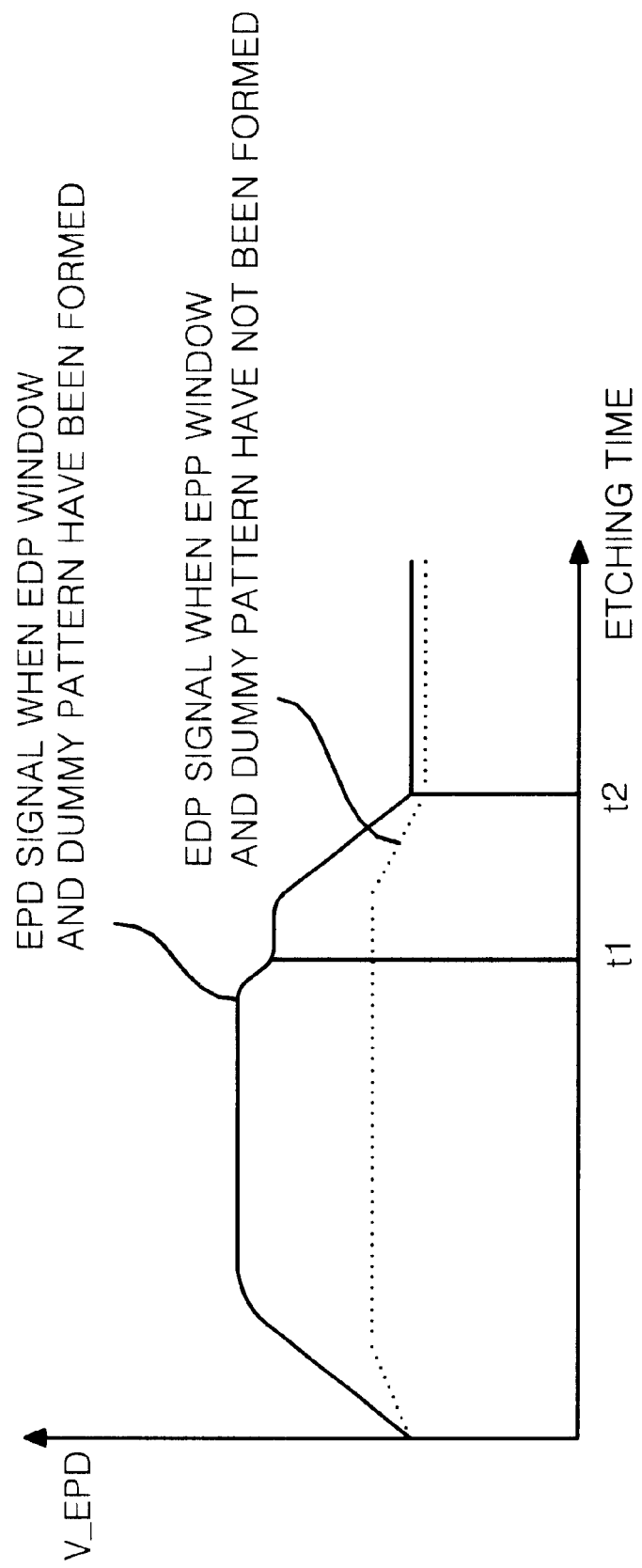
FIG. 8 is a characteristic graph representing an EPD signal detected in a process of forming the contact hole in FIG. 5.

With the lapse of time, as shown in FIG. 7B, if the organic protective film 46 within the EPD window 52 and the real pattern window 53 is completely removed, then the gate insulating film 22 is exposed. At this time, a concentration of the evacuated SiF$_4$ gas decreases as shown in FIG. 8. Specifically, FIG. 8 illustrates the voltage of a detection (EPD) signal representing the amount of detected SiF$_4$ in the evacuated gas over time. Accordingly, as shown in FIG. 8, an operator can determined that at time t1 the gate insulating film 22 is exposed because of the drop in the EPD signal voltage in accordance with a change in SiF$_4$ gas production.

As the etching time progresses, the gate insulating film 22 within the EPD windows 52 and the real pattern window 53 is removed. When the gate insulating film 22 is completely removed, the dummy pattern 48 and the pad 2a of the gate line 2 are exposed as shown in FIG. 7C to form the contact hole 21a. At this time, t2 in FIG. 8, a concentration of the SiF$_4$ gas is dramatically reduced. An operator can detect this time t2 (i.e., when the dummy pattern 48 and the pad 2a of the gate line 2 are exposed) because the voltage level of the EPD signal will have lowered dramatically as shown in FIG. 8. Accordingly, an operator can stop the etching process at time t2 to prevent over-etching of the pad 2a of the gate line or the substrate 18.

As a result, the present invention forms the dummy pattern with the same thickness and material as a real pattern to be etched under the EPD window 52, thereby allowing an etching time within the EPD window 52 to equal that within the real pattern window 53. In FIG. 8, a dotted line represents an EPD signal when the EPD window 52 and the dummy pattern 48 have not been formed, and a solid line represents an EPD signal detected when the EPD window 52 and the dummy pattern 48 have been formed. It can be seen from FIG. 8 that, since a difference between the variations in the voltage of the EPD signal V$_{13}$ EPD before and after an etching end time t2 increases, an operator can easily detect the etching end time t2.

On the other hand, the dummy pattern 48 may be formed from a different material, have a different thickness and/or have a different structure from a real pattern depending on the a real pattern to be etched. The dummy pattern 48 has the structure of a metallic film and/or inorganic film in the above-described embodiment, but could have other structures. For instance, the dummy pattern could have the structure of a metal film, an inorganic film, a semiconductor layer, and an Ohmic contact layer when the end time for etching a contact hole at the drain electrode 30 is to be detected. Namely, the dummy pattern can have the same structure as any real structure under a real etching window.

As described above, the EPD window in the liquid crystal display device and the etching end point detecting method using the EPD window according to the present invention allows an etching end time within the EPD window to be equal to that within the real pattern window by forming a dummy pattern under the EPD window.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An intermediate liquid crystal display device product, comprising:

a real pattern formed on a substrate;

a dummy pattern formed on the substrate, the dummy pattern having a same thickness as the real pattern; and a window definition layer defining an etching end point detection window over the dummy pattern, said etching end point detection window over the dummy pattern having a width greater than a width of the real pattern.

2. The device of claim 1, further comprising:

an organic protective film formed over the real pattern and the dummy pattern and under the window definition layer.

3. The device of claim 2, wherein the etching end point detection window exposes the organic protective film.

4. The device of claim 2, wherein the window definition layer further defines an etching window over the real pattern.

5. The device of claim 4, wherein the etching end point detection window and the etching window expose the organic protective film.

6. The device of claim 2, further comprising:

an inorganic insulating film formed between the organic protective film and the dummy pattern and between the organic protective film and the real pattern.

7. The device of claim 6, wherein the window definition layer further defines an etching window over the real pattern.

8. The device of claim 6, wherein the etching end point detection window and the etching window expose the organic protective film.

9. The device of claim 1, wherein the dummy pattern is made from a same material as the real pattern.

10. The device of claim 1, wherein the real pattern is formed on a display region of the substrate; and the dummy pattern is formed on a non-display region of the substrate.

11. The device of claim 1, wherein the dummy pattern is formed on a region of the substrate cut-out to form the liquid crystal display device.

12. The device of claim 1, wherein the dummy pattern is formed between conductive pads on the substrate, the conductive pads forming part of the liquid crystal display device.

13. The device of claim 1, wherein the dummy pattern has a same structure as the real pattern.

14. A method of forming an etching end point detection window, comprising:

forming a real pattern on a substrate;

forming a dummy pattern formed having a same thickness as the real pattern on the substrate; and forming a window definition layer defining an etching end point detection window over the dummy pattern, said etching end point detection window over the dummy pattern having a width greater than a width of the real pattern.

15. The method of claim 14, further comprising:

forming an organic protective film over the real pattern and the dummy pattern prior to the forming a window definition layer step.

16. The method of claim 15, wherein the etching end point detection window exposes the organic protective film.

17. The method of claim 16, wherein the forming a window definition layer step forms the window definition layer such that the window definition layer further defines an etching window over the real pattern.

18. The method of claim 17, wherein the etching end point detection window and the etching window expose the organic protective film.

19. The method of claim 15, further comprising:

forming an inorganic insulating film on the dummy pattern and the real pattern prior to the forming an organic protective film step.

20. The method of claim 19, wherein the forming a window definition layer step forms the window definition layer such that the window definition layer further defines an etching window over the real pattern.

21. The method of claim 20, wherein the etching end point detection window and the etching window expose the organic protective film.

22. The method of claim 14, wherein the dummy pattern is made from a same material as the real pattern.

23. The method of claim 14, wherein
the forming a real pattern step forms the real pattern on a display region of the substrate; and
the forming a dummy pattern step forms the dummy pattern on a non-display region of the substrate.

24. The method of claim 14, wherein the forming a dummy pattern step forms the dummy pattern on a region of the substrate cut-out to form the liquid crystal display device.

25. The method of claim 14, wherein the forming a dummy pattern step forms the dummy pattern between conductive pads on the substrate, the conductive pads forming part of the liquid crystal display device.

26. The method of claim 14, wherein the forming a dummy pattern step forms the dummy pattern to have a same structure as the real pattern.

27. The method of claim 14, wherein the forming a dummy pattern step and the forming a real pattern step are performed simultaneously.

28. An etching end point detecting method, comprising:
forming a real pattern on a substrate;
forming a dummy pattern formed having a same thickness as the real pattern on the substrate;
forming a window definition layer which defines an etching end point detection window over the dummy pattern and an etch window over the real pattern, said etching end point detection window over the dummy pattern having a width greater than a width of the real pattern;
etching via the etching end point detection window and the etch window;
detecting a reaction result from the etching step; and
determining an etching end point based on output from the detecting step.

29. The method of claim 28, further comprising:
forming an organic protective film over the real pattern and the dummy pattern prior to the forming a window definition layer step.

30. The method of claim 29, wherein the etching step etches at least the organic protective film via the etching end point detection window and the etch window.

31. The method of claim 30, wherein the etching step detects a gas produced during the etching step.

32. The method of claim 29, further comprising:
forming an inorganic insulating film on the dummy pattern and the real pattern prior to the forming an organic protective film step.

33. The method of claim 32, wherein the etching step etches at least the organic protective film and the inorganic insulating film via the etching end point detection window and the etch window.

34. The method of claim 33, wherein the etching step detects a gas produced during the etching step.

35. The method of claim 33, wherein
the etching step detects a gas produced during the etching step; and
the determining step determines an etching end point when an amount of detected gas decreases.

36. The method of claim 28, wherein the dummy pattern is made from a same material as the real pattern.

37. The method of claim 28, wherein the forming a dummy pattern step forms the dummy pattern to have a same structure as the real pattern.

38. The method of claim 28, wherein the forming a dummy pattern step and the forming a real pattern step are performed simultaneously.

39. An intermediate liquid crystal display device product, comprising:
a real pattern formed on a substrate;
a dummy pattern formed on the substrate, the dummy pattern having a same thickness as the real pattern; and
a window definition layer defining an etching end point detection window over the dummy pattern and an etching window over the real pattern, the etching end point detection window over the dummy pattern having a width greater than twice a width of the etching window over the real pattern.

40. A method of forming an etching end point detection window, comprising:
forming a real pattern on a substrate;
forming a dummy pattern formed having a same thickness as the real pattern on the substrate; and
forming a window definition layer defining an etching end point detection window over the dummy pattern, and an etching wind over the real pattern, the etching end point detection window over the dummy pattern having a width greater than twice a width of the etching window over the real pattern.

41. An etching end point detecting method, comprising:
forming a real pattern on a substrate;
forming a dummy pattern formed having a same thickness as the real pattern on the substrate;
forming a window definition layer which defines an etching end point detection window over the dummy pattern and an etch window over the real pattern, the etching end point detection window over the dummy pattern having a width greater than twice a width of the etching window over the real pattern;
etching via the etching end point detection window and the etch window;
detecting a reaction result from the etching step; and
determining an etching end point based on output from the detecting step.

* * * * *